United States Patent
Türk et al.

(10) Patent No.: US 10,072,235 B2
(45) Date of Patent: Sep. 11, 2018

(54) FORMULATIONS, THE PRODUCTION AND USE THEREOF, AND SUITABLE COMPONENTS

(71) Applicant: BASF SE, Ludwigshafen (DE)

(72) Inventors: Holger Türk, Mannheim (DE); Heike Weber, Mannheim (DE); Gazi Türkoglu, Mannheim (DE)

(73) Assignee: BASF SE, Ludwigshafen (DE)

( * ) Notice: Subject to any disclaimer, the term of this patent is extended or adjusted under 35 U.S.C. 154(b) by 124 days.

(21) Appl. No.: 15/319,493

(22) PCT Filed: Jun. 12, 2015

(86) PCT No.: PCT/EP2015/063134
§ 371 (c)(1),
(2) Date: Dec. 16, 2016

(87) PCT Pub. No.: WO2015/197379
PCT Pub. Date: Dec. 30, 2015

(65) Prior Publication Data
US 2017/0130168 A1    May 11, 2017

(30) Foreign Application Priority Data

Jun. 23, 2014 (EP) .................... 14173388

(51) Int. Cl.
| | | |
|---|---|---|
| C11D 3/37 | (2006.01) | |
| C08F 251/00 | (2006.01) | |
| C11D 3/00 | (2006.01) | |
| C11D 3/33 | (2006.01) | |
| C11D 11/00 | (2006.01) | |
| C11D 3/39 | (2006.01) | |

(52) U.S. Cl.
CPC .......... *C11D 3/3788* (2013.01); *C08F 251/00* (2013.01); *C11D 3/0036* (2013.01); *C11D 3/33* (2013.01); *C11D 3/3942* (2013.01); *C11D 11/0035* (2013.01)

(58) Field of Classification Search
CPC .............................. C08F 251/00; C11D 3/3788
USPC .................................. 510/400, 475
See application file for complete search history.

(56) References Cited

U.S. PATENT DOCUMENTS

2011/0118168 A1 *  5/2011  Schunicht ............. C08F 251/00
                                              510/400
2013/0102515 A1    4/2013  Hueffer et al.

FOREIGN PATENT DOCUMENTS

| EP | 0 526 800 A1 | 2/1993 |
| EP | 2138560 A1 | 12/2009 |
| WO | 2008095562 A1 | 8/2008 |
| WO | 2013/056996 A1 | 4/2013 |
| WO | 2015197378 A1 | 12/2015 |

OTHER PUBLICATIONS

European Search Report issued in European Patent Application No. EP 14 17 3388 dated Nov. 26, 2014.
International Search Report for PCT/EP2015/063134, dated Jul. 17, 2015. 2 pages.

\* cited by examiner

*Primary Examiner* — Gregory E Webb
(74) *Attorney, Agent, or Firm* — Armstrong Teasdale LLP

(57) ABSTRACT

A formulation including
(A) at least one compound selected from methylglycine diacetate (MGDA) and glutamic acid diacetate (GLDA) and salts thereof,
(B) at least one graft copolymer composed of
  (a) at least one graft base selected from nonionic monosaccharides, disaccharides, oligosaccharides and polysaccharides,
    and side chains obtainable by grafting on of
  (b) at least one ethylenically unsaturated mono- or dicarboxylic acid and
  (c) at least one compound of the general formula (I),

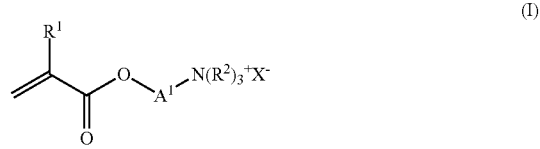

where the variables are defined as follows:
$R^1$ is selected from methyl and hydrogen,
$A^1$ is selected from $C_2$-$C_4$-alkylene,
$R^2$ are identical or different and selected from $C_1$-$C_4$-alkyl,
$X^-$ is selected from halide, mono-$C_1$-$C_4$-alkyl sulfate and sulfate.

18 Claims, No Drawings

FORMULATIONS, THE PRODUCTION AND USE THEREOF, AND SUITABLE COMPONENTS

CROSS-REFERENCE TO RELATED APPLICATIONS

This application is a U.S. National Phase Application of PCT/EP2015/063134, filed Jun. 12, 2015, which is incorporated herein by reference in its entirety.

The present application relates to formulations comprising
(A) at least one compound selected from methylglycine diacetate (MGDA) and glutamic acid diacetate (GLDA) and salts thereof,
(B) at least one graft copolymer composed of
  (a) at least one graft base selected from nonionic monosaccharides, disaccharides, oligosaccharides and polysaccharides, and side chains obtainable by grafting on of
  (b) at least one ethylenically unsaturated mono- or dicarboxylic acid and
  (c) at least one compound of the general formula (I),

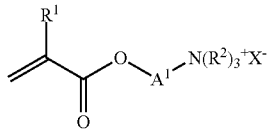

where the variables are defined as follows:
$R^1$ is selected from methyl and hydrogen,
$A^1$ is selected from $C_2$-$C_4$-alkylene,
$R^2$ are identical or different and selected from $C_1$-$C_4$-alkyl,
$X^-$ is selected from halide, mono-$C_1$-$C_4$-alkyl sulfate and sulfate.

Furthermore, the present application relates to uses of the formulations according to the invention and to a process for their preparation. Furthermore, the present invention relates to graft copolymers which are composed of
(a) at least one graft base selected from nonionic monosaccharides, disaccharides, oligosaccharides and polysaccharides,
  and side chains obtainable by grafting on of
(b) at least one ethylenically unsaturated mono- or dicarboxylic acid and
(c) at least one compound of the general formula (I),

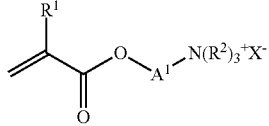

where the variables are defined as follows:
$R^1$ is selected from methyl and hydrogen,
$A^1$ is selected from $C_2$-$C_4$-alkylene,
$R^2$ are identical or different and selected from $C_1$-$C_4$-alkyl,
$X^-$ is selected from halide, mono-$C_1$-$C_4$-alkyl sulfate and sulfate.

Dishwashing detergents have to meet many requirements. For example, they have to clean the dishes thoroughly, they should have no harmful or potentially harmful substances in the wastewater, they should permit the running-off and drying of the water from the dishes, the detached soil constituents must be lastingly dispersed or emulsified so that they do not deposit themselves on the surface of the ware. The dishwashing detergents should not lead to problems during the operation of the dishwasher. Finally, they should not lead to esthetically undesired consequences on the item to be cleaned. In particular, no whitish marks or deposits should arise which are formed on account of the presence of lime or other inorganic and organic salts during the drying up of water drops or, as a result of deposition of soil constituents or inorganic salts, deposit themselves on the ware even during the washing process.

Particularly in modern machine dishwashing detergents, multifunctional detergents (e.g. 3-in-1 detergents or generally x-in-1 detergents), the functions of cleaning, of clear rinsing and of water softening are combined in a single detergent formulation, meaning that both the topping up of salt (in the case of water hardness from 0° to 21° German hardness) as well as the topping up of rinse aid becomes superfluous for the consumer.

In x-in-1 detergents, polymers are often used for the purposes of inhibiting deposition. These may be in phosphate-containing detergents for example sulfonate-containing polymers which exhibit in particular effects on the inhibition of calcium phosphate deposits. The surfactants used are selected such that they are carried into the clear-rinse process, where they ensure optimum wetting and a good clear-rinse result. Further suitable polymers are polycarboxylates such as, for example, polyacrylic acids.

The trend towards phosphate-free detergents, which are also furthermore intended to be used without rinse aid and ion exchanger, however, requires new solutions. In phosphate-free dishwashing detergents, the composition of the salts that are produced is different to that in phosphate-containing detergents, meaning that polymers used hitherto are in many cases not adequately effective. In particular, as far as deposit inhibition is concerned, phosphate-free dishwashing detergents are still in need of improvement.

EP 2 138 560 A1 discloses graft copolymers and their use in compositions for cleaning hard surfaces, including as dishwashing detergents. The detergents proposed in EP 2 138 560 A1, however, in many cases do not have adequate deposit inhibition, for example as dishwashing detergents on cutlery items such as knives and in particular on glass.

It was therefore the object to provide formulations which have a very good deposit inhibition—in particular in phosphate-free compositions—especially on glass. It was also the object to provide a process by means of which formulations can be prepared which have a very good deposit inhibition—in particular in phosphate-free compositions. It was finally the object to provide suitable components for formulations of this kind.

Accordingly, the formulations defined at the start have been found, in the context of the present invention also termed formulations according to the invention.

Formulations according to the invention can be liquid, solid, pasty or gel-like at room temperature, i.e. at 20° C. Preferably, formulations according to the invention are solid at room temperature. Formulations according to the invention that are solid at room temperature can be anhydrous or contain water, for example up to 20% by weight, preferably 0.1 to 10% by weight of water, determinable for example by Karl-Fischer titration or by determination of the dry residue at 80° C. under reduced pressure. Formulations according to the invention that are solid at room temperature can be present for example in the form of powder, granules or tablets.

In another embodiment, formulations according to the invention are liquid at 20° C. Formulations according to the invention that are liquid at 20° C. can comprise 30 to 80% by weight of water, preferably 40 to 80% by weight. Also in such embodiments, the water content can be determined by determining the dry residue at 80° C. under reduced pressure. Formulations according to the invention that are liquid at room temperature can be present for example in gel form.

Formulations according to the invention comprise
(A) at least one compound, for short also called compound (A), selected from methylglycine diacetate (MGDA) and glutamic acid diacetate (GLDA), and salts thereof. Preferably, compound (A) is selected from MGDA and its salts, in particular its sodium salts.

MGDA and GLDA can be present as racemate or as enantiomerically pure compound. GLDA is preferably selected from L-GLDA or enantiomerically enriched mixtures of L-GLDA in which at least 80 mol %, preferably at least 90 mol %, of L-GLDA is present.

In one embodiment of the present invention, compound (A) is selected from racemic MGDA. In another embodiment of the present invention, compound (A) is selected from L-MGDA or from enantiomer mixtures of L- and D-MGDA in which L-MGDA predominates and in which the L/D molar ratio is in the range from 55:45 to 95:5, preferably 60:40 to 85:15. The L/D molar ratio can be determined for example by polarimetry or by chromatographic means, preferably by HPLC with a chiral column, for example with cyclodextrin as stationary phase or with an optically active ammonium salt immobilized on the column. For example, it is possible to use an immobilized D-penicillamine salt.

MGDA or GLDA is preferably used as the salt. Preferred salts are ammonium salts and alkali metal salts, particularly preferably the potassium and in particular the sodium salts. These can for example have the general formula (II) or (III):

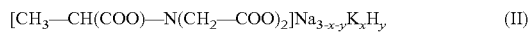

x in the range from 0.0 to 0.5, preferably up to 0.25,
y in the range from 0.0 to 0.5, preferably up to 0.25,

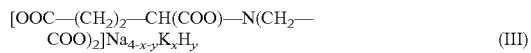

x in the range from 0.0 to 0.5, preferably up to 0.25,
y in the range from 0.0 to 0.5, preferably up to 0.25.

Very particular preference is given to the trisodium salt of MGDA and the tetrasodium salt of GLDA.

Compound (A) can comprise, in small amounts, cations which are different from alkali metal ions, for example $Mg^{2+}$, $Ca^{2+}$ or iron ions, for example $Fe^{2+}$ or $Fe^{3+}$. Ions of this kind are in many cases present in compound (A) as a consequence of the preparation. Cations different from alkali metal ions are present in one embodiment of the present invention in the range from 0.01 to 5 mol %, based on total MGDA or total GLDA.

In another embodiment of the present invention, no measurable fractions of cations which are different from alkali metal ions are present in compound (A).

In one embodiment of the present invention, compound (A) comprises small amounts of one or more impurities, which can be as a consequence of the preparation. In the case of MGDA, for example propionic acid, alanine or lactic acid may be comprised as impurity. Small amounts in this connection are fractions for example in the range from 0.01 to 1% by weight, based on compound (A). Impurities of this kind are disregarded in the context of the present invention unless expressly stated otherwise.

In one embodiment of the present invention, the formulation according to the invention comprises a compound (A), for example only trisodium salt of MGDA or only tetrasodium salt of GLDA. In this connection, compounds of the formulae (II) or (III) where x or y is not equal to zero should also in each case be referred to as one compound.

In another embodiment of the present invention, the formulation according to the invention comprises two compounds (A), for example a mixture of trisodium salt of MGDA and tetrasodium salt of GLDA, for example in a molar ratio in the range from 1:1 to 1:10.

Formulations according to the invention furthermore comprise
(B) at least one graft copolymer, which in the context of the present invention is also called graft copolymer (B) or graft copolymer (B) according to the invention and which is composed of
(a) at least one graft base, called graft base (a) for short, which is selected from nonionic monosaccharides, disaccharides, oligosaccharides and polysaccharides, and side chains obtainable by grafting on of
(b) at least one ethylenically unsaturated mono- or dicarboxylic acid, called monocarboxylic acid (b) or dicarboxylic acid (b) for short, and
(c) at least one compound of the general formula (I), called monomer (c) or compound (I) for short,

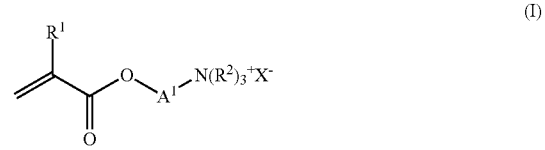

where the variables are defined as follows:
$R^1$ is selected from methyl and hydrogen,
$A^1$ is selected from $C_2$-$C_4$-alkylene,
$R^2$ are identical or different and selected from $C_1$-$C_4$-alkyl,
$X^-$ is selected from halide, mono-$C_1$-$C_4$-alkyl sulfate and sulfate.

Nonionic monosaccharides suitable as graft base (a) selected may be for example aldopentoses, pentuloses (ketopentoses), aldohexoses and hexuloses (ketohexoses). Suitable aldopentoses are e.g. D-ribose, D-xylose and L-arabinose. Aldohexoses that may be mentioned are D-glucose, D-mannose and D-galactose; examples of hexuloses (ketohexoses) to be mentioned are in particular D-fructose and D-sorbose.

In the context of the present invention, deoxy sugars such as, for example, L-fucose and L-rhamnose, should also be included among nonionic monosaccharides.

Examples of nonionic disaccharides which may be mentioned are, for example, cellobiose, lactose, maltose and sucrose.

In the context of the present invention, nonionic oligosaccharides that may be mentioned are nonionic carbohydrates with three to ten nonionic monosaccharide units per molecule, for example glycans. In the context of the present invention, nonionic polysaccharides is the term used to refer to nonionic carbohydrates with more than ten nonionic monosaccharide units per molecule. Nonionic oligo- and polysaccharides may be for example linear, cyclic or branched. Nonionic polysaccharides to be mentioned by way of example are biopolymers such as starch and glycogen, and cellulose and dextran. Furthermore, mention is to be made of inulin as polycondensate of D-fructose (fructans) and chitin. Further examples of nonionic polysaccharides are nonionic starch degradation products, for example products which can be obtained by enzymatic or so-called chemical degradation of starch. One example of the so-called chemical degradation of starch is acid-catalyzed hydrolysis.

Preferred examples of nonionic starch degradation products are maltodextrins. In the context of the present invention, maltodextrin is the term used to refer to mixtures of monomers, dimers, oligomers and polymers of glucose. The percentage composition differs depending on the degree of hydrolysis. This is described by the dextrose equivalent, which in the case of maltodextrin is between 3 and 40.

Preferably, graft base (a) is selected from nonionic polysaccharides, in particular from starch, which is preferably not chemically modified, for example hydroxyl groups thereof are preferably neither esterified nor etherified. In one embodiment of the present invention, starch is selected from those nonionic polysaccharides which have in the range from 20 to 30% by weight amylose and in the range from 70 to 80% amylopectin. Examples are corn starch, rice starch, potato starch and wheat starch.

Side chains are grafted on to the graft base (a). Per molecule of graft copolymer (B), preferably on average one to ten side chains can be grafted on. Preferably, in this connection, a side chain is linked with the anomeric carbon atom of a monosaccharide or with an anomeric carbon atom of the chain end of an oligo- or polysaccharide. The number of side chains is limited upwards by the number of carbon atoms with hydroxyl groups of the graft base (a) in question.

Examples of monocarboxylic acids (b) are ethylenically unsaturated $C_3$-$C_{10}$-monocarboxylic acids and the alkali metal or ammonium salts thereof, in particular the potassium and the sodium salts. Preferred monocarboxylic acids (b) are acrylic acid and methacrylic acid, and also sodium (meth)acrylate. Mixtures of ethylenically unsaturated $C_3$-$C_{10}$ monocarboxylic acids and in particular mixtures of acrylic acid and methacrylic acid are also preferred components (b).

Examples of dicarboxylic acids (b) are ethylenically unsaturated $C_4$-$C_{10}$-dicarboxylic acids and their mono- and in particular dialkali metal or ammonium salts, in particular the dipotassium and the disodium salts, and also anhydrides of ethylenically unsaturated $C_4$-$C_{10}$-dicarboxylic acids. Preferred dicarboxylic acids (b) are maleic acid, fumaric acid, itaconic acid, and also maleic anhydride and itaconic anhydride.

In one embodiment, graft copolymer (B) comprises in at least one side chain, besides monomer (c) at least one monocarboxylic acid (b) and at least one dicarboxylic acid (b). In a preferred embodiment of the present invention, graft copolymer (B) comprises in polymerized-in form in the side chains, besides monomer (c), exclusively monocarboxylic acid (b), but no dicarboxylic acid (b).

Monomers (c) are ethylenically unsaturated N-containing compounds with a permanent cationic charge.

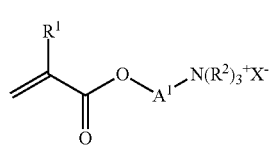
(I)

where the variables are defined as follows:
$R^1$ is selected from methyl and hydrogen,
$A^1$ is selected from $C_2$-$C_4$-alkylene, for example —$CH_2$—$CH_2$—, —$CH_2$—$CH(CH_3)$—, —$(CH_2)_3$—, —$(CH_2)_4$—, preferably —$CH_2$—$CH_2$— and —$(CH_2)_3$—,
$R^2$ are different or preferably identical and selected from $C_1$-$C_4$-alkyl, for example methyl, ethyl, n-propyl, n-butyl, isopropyl, isobutyl, sec-butyl, tert-butyl, preferably at least two $R^2$ are identical and in each case methyl, and the third group $R^2$ is ethyl, n-propyl or n-butyl, or two $R^2$ are identical and in each case ethyl, and the third group $R^2$ is methyl, n-propyl or n-butyl. Particularly preferably, all three $R^2$ are in each case identical and selected from methyl.
$X^-$ is selected from halide, for example iodide, bromide and in particular chloride, also from mono-$C_1$-$C_4$-alkyl sulfate and sulfate. Examples of mono-$C_1$-$C_4$-alkyl sulfate are methyl sulfate, ethyl sulfate, isopropyl sulfate and n-butyl sulfate, preferably methyl sulfate and ethyl sulfate. If $X^-$ is selected as sulfate, then $X^-$ is a half equivalent of sulfate.

In a preferred embodiment of the present invention, in monomer (c) the variables are selected as follows:
$R^1$ is hydrogen or methyl,
$R^2$ are identical and in each case methyl,
$A^1$ is $CH_2CH_2$, and
$X^-$ is chloride.

In one embodiment of the present invention, monomer (c) is selected from

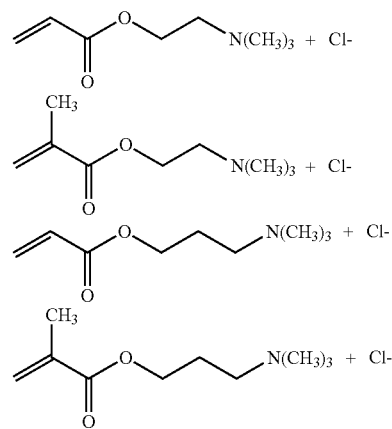

Graft copolymer (B) can comprise, in polymerized-in form, in one or more side chains at least one further comonomer (d), for example hydroxyalkyl esters such as 2-hydroxyethyl (meth)acrylate or 3-hydroxypropyl (meth)acrylate, or esters of alkoxylated fatty alcohols, or comonomers containing sulfonic acid groups, for example 2-acrylamido-2-methylpropanesulfonic acid (AMPS) and its alkali metal salts.

Preferably, graft copolymer (B) comprises no further comonomers (d) in one or more side chains apart from monomer (c) and monocarboxylic acid (b) or dicarboxylic acid (b).

In one embodiment of the present invention, the fraction of graft base (a) in graft copolymer (B) is in the range from 40 to 95% by weight, preferably from 50 to 90% by weight, in each case based on total graft copolymer (B).

In one embodiment of the present invention, the fraction of monocarboxylic acid (b) or dicarboxylic acid (b) is in the range from 2 to 40% by weight, preferably from 5 to 30% by weight and in particular from 5 to 25% by weight, in each case based on total graft copolymer (B).

Monomer(s) of type (c) is/are polymerized in amounts of from 5 to 50% by weight, preferably from 5 to 40% by weight and particularly preferably from 5 to 30% by weight, in each case based on total graft copolymer (B).

It is preferred if graft copolymer (B) comprises, in polymerized-in form, more monocarboxylic acid (b) than compound (c), and specifically based on the molar fractions, for example in the range from 1.1:1 to 5:1, preferably 2:1 to 4:1.

In one embodiment of the present invention, the average molecular weight ($M_w$) of graft copolymer (B) is in the range from 2000 to 200 000 g/mol, preferably from 5000 to 150 000 and in particular in the range from 8000 to 100 000 g/mol. The average molecular weight $M_w$ is measured preferably by gel permeation chromatography in aqueous KCl/formic acid solution.

Graft copolymer (B) can preferably be obtained as aqueous solution from which it can be isolated, e.g. by spray drying, spray granulation or freeze drying.

If desired, solution of graft copolymer (B) or dried graft copolymer (B) can be used for producing the formulations according to the invention.

It is preferred to stabilize graft copolymer (B) by at least one biocide. Examples of suitable biocides are isothiazolinones, for example 1,2-benzisothiazolin-3-one ("BIT"), octylisothiazolinone ("OIT"), dichlorooctylisothiazolinone ("DCOIT"), 2-methyl-2H-isothiazolin-3-one ("MIT") and 5-chloro-2-methyl-2H-isothiazolin-3-one ("CIT"), phenoxyethanol, alkylparabens such as methylparaben, ethylparaben, propylparaben, benzoic acid and its salt such as e.g. sodium benzoate, benzyl alcohol, alkali metal sorbates such as e.g. sodium sorbate, and optionally substituted hydantoins such as e.g. 1,3-bis(hydroxymethyl)-5,5-dimethylhydantoin (DMDM hydantoin). Further examples are 1,2-dibromo-2,4-dicyanobutane, iodo-2-propynyl butyl carbamate, iodine and iodophores.

In one embodiment of the present invention, the formulation according to the invention is free from phosphates and polyphosphates, with hydrogenphosphates being subsumed, for example free from trisodiumphosphate, pentasodiumtripolyphosphate and hexasodiummetaphosphate. In connection with phosphates and polyphosphates, in the context of the present invention, "free from" is to be understood as meaning that the content of phosphate and polyphosphate is in total in the range from 10 ppm to 0.2% by weight, determined by gravimetry.

In one embodiment of the present invention, the formulation according to the invention is free from those heavy metal compounds which do not act as bleach catalysts, in particular from compounds of iron. In connection with heavy metal compounds in the context of the present invention, "free from" is to be understood as meaning that the content of heavy metal compounds which do not act as bleach catalysts is in total in the range from 0 to 100 ppm, preferably 1 to 30 ppm, determined by the Leach method.

In the context of the present invention, "heavy metals" are all metals with a specific density of at least 6 g/cm$^3$, with the exception of zinc and bismuth. In particular, heavy metals are precious metals, and also iron, copper, lead, tin, nickel, cadmium and chromium.

In one embodiment of the present invention, the formulation according to the invention comprises
in total in the range from 1 to 50% by weight of compound (A), preferably 5 to 45% by weight, particularly preferably 10 to 35% by weight;
in total in the range from 0.1 to 4% by weight of graft copolymer (B), preferably 0.3 to 2% by weight, particularly preferably 0.5 to 1.5% by weight,
based in each case on solids content of the formulation according to the invention in question.

Formulations according to the invention can be free from bleaches, for example free from inorganic peroxide compounds or chlorine bleaches such as sodium hypochlorite. Free from inorganic peroxide compounds or chlorine bleaches is to be understood here as meaning that such formulations according to the invention comprise in total 0.01% by weight or less of inorganic peroxide compound and chlorine bleach, based in each case on solids content of the formulation according to the invention in question.

In another embodiment of the present invention, the formulation according to the invention comprises
(C) at least one inorganic peroxide compound, in the context of the present invention also referred to in short as peroxide (C). Peroxide (C) is selected from sodium peroxodisulfate, sodium perborate and sodium percarbonate, preferably sodium percarbonate.

Peroxide (C) can be anhydrous or preferably water-containing. Examples of water-containing sodium perborate is $Na_2[B(OH)_2(O_2)]_2$), sometimes also written as $NaBO_2.O_2.3H_2O$. An example of water-containing sodium percarbonate is 2 $Na_2CO_3.3H_2O_2$. Particularly preferably, peroxide (C) is selected from water-containing percarbonates.

Preferably, the formulation according to the invention comprises in the range from 1 to 20% by weight of peroxide (C), preferably 2 to 12% by weight, particularly preferably 3 to 12% by weight, based on solids content of the formulation in question.

Formulations according to the invention which comprise at least one peroxide (C) are preferably solid at room temperature.

In another embodiment, the formulation according to the invention comprises
(C) at least one chlorine-containing bleach, which is also referred to for short as chlorine bleach (C) in the context of the present invention. Chlorine bleach (C) is preferably sodium hypochlorite.

Formulations according to the invention containing chlorine bleach (C) are preferably liquid at room temperature.

Preferably, the formulation according to the invention comprises in the range from 0.1 to 20% by weight of chlorine bleach (C), preferably 0.5 to 12% by weight, particularly preferably 1 to 12% by weight, based on solids content of the liquid formulation in question.

Formulations according to the invention can comprise one or more further ingredients (D). Ingredients (D) are different from compound (A), graft copolymer (B) and peroxide (C) or chlorine bleach (C).

Formulations according to the invention can have one or more further ingredients (D), for example one or more surfactants, one or more enzymes, one or more enzyme stabilizers, one or more builders, in particular phosphate-free builders, one or more cobuilders, one or more alkali carriers, one or more acids, one or more bleach catalysts, one or more bleach activators, one or more bleach stabilizers, one or more antifoams, one or more corrosion inhibitors, one or more builders, buffers, dyes, one or more fragrances, one or more thickeners, one or more organic solvents, one or more tableting auxiliaries, one or more disintegration agents, also called tablet disintegrants, or one or more solubility promoters.

Examples of surfactants are in particular nonionic surfactants, and mixtures of anionic or zwitterionic surfactants with nonionic surfactants. Preferred nonionic surfactants are alkoxylated alcohols and alkoxylated fatty alcohols, di- and multiblock copolymers of ethylene oxide and propylene oxide and reaction products of sorbitan with ethylene oxide or propylene oxide, alkyl glycosides and so-called amine oxides.

Preferred examples of alkoxylated alcohols and alkoxylated fatty alcohols are compounds of the general formula (IV)

$$R^4-O-\left[\underset{R^3}{\overset{}{\text{CH}}}-O\right]_m-\left[\text{CH}_2\text{CH}_2-O\right]_n-R^5 \quad (IV)$$

in which the variables are defined as follows:
$R^3$ are identical or different and selected from linear $C_1$-$C_{10}$-alkyl, preferably ethyl and particularly preferably methyl,
$R^4$ is selected from $C_8$-$C_{22}$-alkyl, for example n-$C_8H_{17}$, n-$C_{10}H_{21}$, n-$C_{12}H_{25}$, n-$C_{14}H_{29}$, n-$C_{16}H_{33}$ or n-$C_{18}H_{37}$,
$R^5$ is selected from hydrogen and $C_1$-$C_{10}$-alkyl, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl or iso-decyl,
m and n are in the range from zero to 300, where the sum of n and m is at least one. Preferably, m is in the range from 1 to 100 and n is in the range from 0 to 30.

In this connection, compounds of the general formula (IV) may be block copolymers or random copolymers, preferably block copolymers.

Other preferred examples of alkoxylated alcohols and alkoxylated fatty alcohols are compounds of the general formula (V)

$$R^6-O-\left[\underset{R^7}{\overset{}{\text{CH}}}-O\right]_a-\left[\text{CH}_2\text{CH}_2-O\right]_b-\left[\underset{R^7}{\overset{}{\text{CH}}}-O\right]_d-H \quad (V)$$

in which the variables are defined as follows:
$R^6$ is selected from $C_6$-$C_{20}$-alkyl, in particular n-$C_8H_{17}$, n-$C_{10}H_{21}$, n-$C_{12}H_{25}$, n-$C_{14}H_{29}$, n-$C_{16}H_{33}$, n-$C_{18}H_{37}$,
$R^7$ are identical or different and selected from linear $C_1$-$C_4$-alkyl, preferably in each case identical and ethyl and particularly preferably methyl.
a is a number in the range from 1 to 6,
b is a number in the range from 4 to 20,
d is a number in the range from 4 to 25.

Here, compounds of the general formula (V) may be block copolymers or random copolymers, preferably block copolymers.

Other preferred examples of alkoxylated alcohols and alkoxylated fatty alcohols are hydroxy mixed ethers of the general formula (VI)

$$R^8-CH(OH)-CH_2-O-(AO)_k-R^9 \quad (VI)$$

where the variables are selected as follows:
$R^8$ is $C_4$-$C_{30}$-alkyl, branched or unbranched, or $C_4$-$C_{30}$-alkenyl, branched or unbranched, with at least one C—C double bond.
Preferably, $R^8$ is selected from $C_4$-$C_{30}$-alkyl, branched or unbranched, particularly preferably unbranched $C_4$-$C_{30}$-alkyl and very particularly preferably n-$C_{10}$-$C_{12}$-alkyl.
$R^9$ is $C_1$-$C_{30}$-alkyl, branched or unbranched, or $C_2$-$C_{30}$-alkenyl, branched or unbranched, with at least one C—C double bond.
Preferably, $R^9$ is selected from $C_4$-$C_{30}$-alkyl, branched or unbranched, particularly preferably unbranched $C_6$-$C_{20}$-alkyl and very particularly preferably n-$C_8$-$C_{11}$-alkyl.
k is a number in the range from 1 to 100, preferably from 5 to 60, particularly preferably 10 to 50 and very particularly preferably 20 to 40,
AO is selected from alkylene oxide, different or identical and selected from $CH_2-CH_2-O$, $(CH_2)_3-O$, $(CH_2)_4-O$, $CH_2CH(CH_3)-O$, $CH(CH_3)-CH_2-O$ and $CH_2CH(n-C_3H_7)-O$. A preferred example of AO is $CH_2-CH_2-O$ (EO).

In one embodiment of the present invention, $(AO)_k$ is selected from $(CH_2CH_2O)_{k1}$, where k1 is selected from numbers in the range from 1 to 50.

In one embodiment of the present invention, $(AO)_k$ is selected from $-(CH_2CH_2O)_{k2}-(CH_2CH(CH_3)-O)_{k3}$ and $-(CH_2CH_2O)_{k2}-(CH(CH_3)CH_2-O)_{x3}$, where k2 and k3 may be identical or different and are selected from numbers in the range from 1 to 30.

In one embodiment of the present invention, $(AO)_k$ is selected from $-(CH_2CH_2O)_{k4}$, where k4 is in the range from 10 to 50, AO is EO, and $R^8$ and $R^9$, independently of one another, are selected from $C_8$-$C_{14}$-alkyl.

In connection with the present invention, k or k1, k2, k3 and k4 are in each case understood as meaning average values, the numerical average being preferred. Consequently, each of the variables k or k1, k2, k3 or k4 can—if present—signify a fraction. A certain molecule can naturally only ever carry a whole number of AO units.

Further examples of suitable nonionic surfactants are compounds of the general formula (VII) and in particular of the formula (VII a)

$$R^4-\overset{O}{\underset{}{C}}-O-(AO)_w-R^8 \quad (VII)$$

$$R^4-\overset{O}{\underset{}{C}}-O-(AO)_{w1}-(EO)_{w2}-(A^3O)_{w3}-R^8 \quad (VII a)$$

where
$R^4$ and AO are as defined above and EO is ethylene oxide, i.e. $CH_2CH_2O$, where the AO in formula (VII) and (VII a) can in each case be identical or different,
$R^8$ is selected from $C_8$-$C_{18}$-alkyl, linear or branched
$A^3O$ is selected from propylene oxide and butylene oxide,
w is a number in the range from 15 to 70, preferably 30 to 50,
w1 and w3 are numbers in the range from 1 to 5 and
w2 is a number in the range from 13 to 35.

Further suitable nonionic surfactants are selected from di- and multiblock copolymers composed of ethylene oxide and propylene oxide. Further suitable nonionic surfactants are selected from ethoxylated or propoxylated sorbitan esters. Likewise of suitability are amine oxides or alkylglycosides.

An overview of suitable further nonionic surfactants can be found in EP-A 0 851 023 and in DE-A 198 19 187.

Mixtures of two or more different nonionic surfactants may also be present.

Examples of anionic surfactants are $C_8$-$C_{20}$-alkyl sulfates, $C_8$-$C_{20}$-alkylsulfonates and $C_8$-$C_{20}$-alkyl ether sulfates with one to 6 ethylene oxide units per molecule.

In one embodiment of the present invention, the formulation according to the invention can comprise in the range from 3 to 20% by weight of surfactant.

Formulations according to the invention can comprise one or more enzymes. Examples of enzymes are lipases, hydrolases, amylases, proteases, cellulases, esterases, pectinases, lactases and peroxidases.

Formulations according to the invention can comprise for example up to 5% by weight of enzyme, preferably 0.1 to 3% by weight, in each case based on total solids content of the formulation according to the invention.

Formulations according to the invention can comprise one or more enzyme stabilizers. Enzyme stabilizers serve to protect enzyme—particularly during storage—against damage such as, for example, inactivation, denaturation or decomposition for example as a result of physical influences, oxidation or proteolytic cleavage.

Examples of enzyme stabilizers are reversible protease inhibitors, for example benzamidine hydrochloride, borax, boric acid, boronic acids or salts or esters thereof, including in particular derivatives with aromatic groups, for example ortho-, meta- or para-substituted phenyl boronic acids, in particular 4-formylphenyl boronic acid, or the salts or esters of the aforementioned compounds. Peptide aldehydes, i.e. oligopeptides with a reduced carbon terminus, in particular those made of 2 to 50 monomers, are also used for this purpose. Peptidic reversible protease inhibitors include inter alia ovomucoid and leupeptin. Specific, reversible peptide inhibitors for the protease subtilisin, as well as fusion proteins of proteases and specific peptide inhibitors are also suitable for this purpose.

Further examples of enzyme stabilizers are amino alcohols such as mono-, di-, triethanol- and -propanolamine and mixtures thereof, aliphatic mono- and dicarboxylic acids up to $C_{12}$-carboxylic acids, such as for example succinic acid. Terminally capped fatty acid amide alkoxylates are also suitable enzyme stabilizers.

Other examples of enzyme stabilizers are sodium sulfite, reducing sugars and potassium sulfate. A further example of a suitable enzyme stabilizer is sorbitol.

Formulations according to the invention can comprise one or more builders (D), in particular phosphate-free builders (D). In the context of the present invention, compound (A) does not count as builder (D). Examples of suitable builders (D) are silicates, in particular sodium disilicate and sodium metasilicate, zeolites, sheet silicates, in particular those of the formula $\alpha$-$Na_2Si_2O_5$, $\beta$-$Na_2Si_2O_5$, and $\delta$-$Na_2Si_2O_5$, furthermore citric acid and its sodium salts, succinic acid and its alkali metal salts, fatty acid sulfonates, $\alpha$-hydroxypropionic acid, alkali metal malonates, fatty acid sulfonates, alkyl and alkenyl disuccinates, nitrilotriacetic acid, ethylenediaminetetraacetic acid, diethylenetriaminepentaacetic acid, hydroxyethylethylenediaminetriacetic acid, iminodisuccinic acid, hydroxyiminodisuccinic acid, ethylenediaminedisuccinic acid, aspartic acid diacetic acid, and salts thereof, furthermore carboxymethylinulin, tartaric acid diacetate, tartaric acid monoacetate, oxidized starch, and polymeric builders (D), for example polycarboxylates and polyaspartic acid.

Very particularly preferably, formulations according to the invention comprise a salt of citric acid, in particular sodium citrate, also called sodium citrate (D). In connection with the present invention, this is preferably understood as meaning the dihydrate of the trisodium salt of citric acid.

Preferably, compound (A) is used in a weight ratio to sodium citrate (D) in the range from 10:1 to 1:10, particularly preferably the ratio is 3:1 to 1:8.

Formulations according to the invention can comprise for example in the range from in total 5 to 40% by weight, preferably up to 35% by weight, of further builders, in particular sodium citrate, based on the total solids content of the formulation according to the invention in question.

Very particularly preferably, formulations according to the invention comprise one or more polymeric builders (D). Polymeric builders (D) are understood here as meaning organic polymers, in particular polycarboxylates and polyaspartic acid. Polymeric builders (D) have no or only a negligible effect as surfactant.

In one embodiment of the present invention, polymeric builder (D) is selected from polycarboxylates, for example alkali metal salts of (meth)acrylic acid homopolymers or (meth)acrylic acid copolymers.

Suitable comonomers are monoethylenically unsaturated dicarboxylic acids such as maleic acid, fumaric acid, maleic anhydride, itaconic acid and citraconic acid. A suitable polymer is in particular polyacrylic acid, which preferably has an average molecular weight $M_w$ in the range from 2000 to 40 000 g/mol, preferably 2000 to 10 000 g/mol, in particular 3000 to 8000 g/mol. Also of suitability are copolymeric polycarboxylates, in particular those of acrylic acid with methacrylic acid and of acrylic acid or methacrylic acid with maleic acid and/or fumaric acid.

In one embodiment of the present invention, polymeric builder (D) is selected from one or more copolymers prepared from at least one monomer from the group consisting of monoethylenically unsaturated $C_3$-$C_{10}$-mono- or dicarboxylic acids or anhydrides thereof, such as maleic acid, maleic anhydride, acrylic acid, methacrylic acid, fumaric acid, itaconic acid and citraconic acid and also at least one hydrophilic or hydrophobic comonomer, as listed below.

Suitable hydrophobic monomers are, for example, isobutene, diisobutene, butene, pentene, hexene and styrene, olefins with 10 or more carbon atoms or mixtures thereof such as, for example, 1-decene, 1-dodecene, 1-tetradecene, 1-hexadecene, 1-octadecene, 1-eicosene, 1-docosene, 1-tetracosene and 1-hexacosene, $C_{22}$-$\alpha$-olefin, a mixture of $C_{20}$-$C_{24}$-$\alpha$-olefins and polyisobutene with on average 12 to 100 carbon atoms.

Suitable hydrophilic monomers are monomers with sulfonate or phosphonate groups and also nonionic monomers with hydroxyfunction or alkylene oxide groups. Examples which may be mentioned: allyl alcohol, isoprenol, methoxypolyethylene glycol (meth)acrylate, methoxypolypropylene glycol (meth)acrylate, methoxypolybutylene glycol (meth)acrylate, methoxypoly(propylene oxide-co-ethylene oxide) (meth)acrylate, ethoxypolyethylene glycol (meth)acrylate, ethoxypolypropylene glycol (meth)acrylate, ethoxypolybutylene glycol (meth)acrylate and ethoxypoly(propylene oxide-co-ethylene oxide) (meth)acrylate. The polyalkylene glycols here comprise 3 to 50, in particular 5 to 40 and especially 10 to 30 alkylene oxide units.

Particularly preferred monomers that contain sulfonic acid groups here are 1-acrylamido-1-propanesulfonic acid, 2-acrylamido-2-propanesulfonic acid, 2-acrylamido-2-methylpropanesulfonic acid, 2-methacrylamido-2-methylpropanesulfonic acid, 3-methacrylamido-2-hydroxypropanesulfonic acid, allylsulfonic acid, methallylsulfonic acid, allyloxybenzenesulfonic acid, methallyloxybenzenesulfonic acid, 2-hydroxy-3-(2-propenyloxy)propanesulfonic acid, 2-methyl-2-propene-1-sulfonic acid, styrenesulfonic acid, vinylsulfonic acid, 3-sulfopropyl acrylate, 2-sulfoethyl methacrylate, 3-sulfopropyl methacrylate, sulfomethacrylamide, sulfomethylmethacrylamide, and salts of the aforementioned acids, e.g. the sodium, potassium or ammonium salts thereof.

Particularly preferred phosphonate-group-containing monomers are vinylphosphonic acid and its salts.

Moreover, one or more emphoteric polymers different from graft polymer (B) can be used as polymeric builders (D). Examples of amphoteric polymers are copolymers of at least one ethylenically unsaturated carboxylic acid selected from acrylic acid and methacrylic acid, at least one amide, selected from N—$C_1$-$C_{10}$-alkyl(meth)acrylamide, acrylamide and methacrylamide, and at least one comonomer selected from DADMAC, MAPTAC and APTAC.

Formulations according to the invention can comprise for example in the range from in total 10 to 75% by weight, preferably up to 50% by weight of builder (D), based on the solids content of the formulation according to the invention in question.

Formulations according to the invention can comprise for example in the range from in total 2 to 15% by weight, preferably up to 10% by weight, of polymeric builder (D), based on the solids content of the formulation according to the invention in question.

In a particularly preferred embodiment, formulation according to the invention comprises, besides graft polymer (B), a polymeric builder (D). The weight ratio of polymeric builders (D) to graft copolymer (B) is then preferably 30:1 to 3:1.

In one embodiment of the present invention, formulations according to the invention can comprise one or more cobuilders.

Examples of cobuilders are phosphonates, for example hydroxyalkanephosphonates and aminoalkanephosphonates. Among the hydroxyalkanephosphonates, 1-hydroxyethane-1,1-diphosphonate (HEDP) is of particular importance as cobuilder. It is preferably used as sodium salt, with the disodium salt giving a neutral reaction and the tetrasodium salt an alkaline reaction (pH 9). Suitable aminoalkanephosphonates are preferably ethylenediaminetetramethylenephosphonate (EDTMP), diethylenetriaminepentamethylenephosphonate (DTPMP), and higher homologs thereof. They are preferably used in the form of the neutrally reacting sodium salts, e.g. as hexasodium salt of EDTMP or as hepta- and octasodium salt of DTPMP.

Formulations according to the invention can comprise one or more alkali carriers. Alkali carriers provide for example for the pH of at least 9 if an alkaline pH is desired. Of suitability are, for example, alkali metal carbonates, alkali metal hydrogencarbonates, alkali metal hydroxides and alkali metal metasilicates. A preferred alkali metal is potassium, particularly preferred is sodium.

Formulations according to the invention can comprise one or more bleach catalysts. Bleach catalysts can be selected from bleach-boosting transition metal salts or transition metal complexes such as, for example, manganese-, iron-, cobalt-, ruthenium- or molybdenum-salene complexes or manganese-, iron-, cobalt-, ruthenium- or molybdenum-carbonyl complexes. Manganese, iron, cobalt, ruthenium, molybdenum, titanium, vanadium and copper complexes with nitrogen-containing tripod ligands, and cobalt-, iron-, copper- and ruthenium-amine complexes can also be used as bleach catalysts.

Formulations according to the invention can comprise one or more bleach activators, for example N-methylmorpholinium-acetonitrile salts ("MMA salts"), trimethylammonium acetonitrile salts, N-acylimide such as, for example, N-nonanoylsuccinimide, 1,5-diacetyl-2,2-dioxohexahydro-1,3,5-triazine ("DADHT") or nitrile quats (trimethylammoniumacetonitrile salts).

Further examples of suitable bleach activators are tetraacetylethylenediamine (TAED) and tetraacetylhexylenediamine.

Formulations according to the invention can comprise one or more corrosion inhibitors. In the present case, these are to be understood as meaning those compounds which inhibit the corrosion of metal. Examples of suitable corrosion inhibitors are triazoles, in particular benzotriazoles, bisbenzotriazoles, aminotriazoles, alkylaminotriazoles, also phenol derivatives, for example, hydroquinone, pyrocatechin, hydroxyhydroquinone, gallic acid, phloroglucinol or pyrogallol, also polyethyleneimine and salts of bismuth or zinc.

In one embodiment of the present invention, formulations according to the invention comprise in total in the range from 0.1 to 1.5% by weight of corrosion inhibitor, based on the solids content of the formulation according to the invention in question.

Formulations according to the invention can comprise one or more builders, for example sodium sulfate.

Formulations according to the invention can comprise one or more antifoams, selected for example from silicone oils and paraffin oils.

In one embodiment of the present invention, formulations according to the invention comprise in total in the range from 0.05 to 0.5% by weight of antifoam, based on the solids content of the formulation according to the invention in question.

In one embodiment of the present invention, formulations according to the invention can comprise one or more acids, for example methanesulfonic acid.

In one embodiment, formulations according to the invention comprise one or more disintegration agents, also called tablet disintegrants. Examples are starch polysaccharides, for example dextrans, also crosslinked polyvinylpyrrolidone and polyethylene glycol sorbitan fatty acid esters.

In one embodiment of the present invention, those formulations according to the invention which are liquid at room temperature comprise one or more thickeners.

In order to achieve the desired viscosity of the formulation according to the invention in question, preferably one or more thickeners are added to gel-like formulations according to the invention, it having proven to be particularly advantageous if the formulation according to the invention in question comprises thickeners in the range from 0.1 to 8% by weight, preferably from 0.2 to 6% by weight and particularly preferably from 0.2 to 4% by weight, based on the solids content of the formulation according to the invention in question.

Thickeners that can be selected are polymers originating from nature or modified natural substances or synthetic thickeners.

Examples of polymers originating from nature which are suitable as thickeners in the context of the present invention that are to be mentioned are: agar agar, carrageen, tragacanth, gum Arabic, alginates, pectins, polyoses, guar flour, carob seed flour, starch, dextrins, xanthan, gelatins and casein.

Examples of thickeners from the group of modified natural substances can be selected for example from the group of modified starches and celluloses. By way of example, mention may be made of carboxymethylcellulose and other cellulose ethers, hydroxyethylcellulose and hydroxypropylcellulose, and also seed flour ethers.

Synthetic thickeners are selected from partially cross-linked poly(meth)acrylic acids, hydrophobically modified polyurethanes (HEUR thickeners) and poly(meth)acrylic acid copolymers esterified with fatty alcohol ethoxylates (HASE thickeners).

A particularly preferably used thickener is xanthan.

In one embodiment of the present invention, formulations according to the invention can comprise one or more organic solvents. For example, organic solvents can be selected from the groups of the mono alcohols, diols, triols or polyols, the ethers, esters and/or amides. Particular preference is given in this connection to organic solvents which are water-soluble, with "water-soluble" solvents in the context of the present application being solvents which, at room temperature, are miscible with water completely, i.e. without miscibility gaps.

Organic solvents which are suitable for formulations according to the invention are selected preferably from the group of mono- or polyhydric alcohols, alkanolamines or glycol ethers which are miscible with water in the stated concentration range. Preferably, organic solvents are selected from ethanol, n- or isopropanol, butanols, glycol, 1,2-propanediol, or butanediol, glycerol, diglycol, propyl- or n-butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl, ethyl or propyl ether, dipropylene glycol methyl or ethyl ether, methoxy-, ethoxy- or butoxytriglycol, 1-butoxy-ethoxy-2-propanol, 3-methyl-3-methoxybutanol, propylene glycol t-butyl ether, and mixtures of two or more of the aforementioned organic solvents.

In one embodiment of the present invention, formulations according to the invention have a pH in the range from 6 to 14, preferably 8 to 13. Here, in the case of those formulations according to the invention which are solid at room temperature, the pH of a 1% strength by weight aqueous solution or of the liquid phase of a 1% strength by weight aqueous suspension is determined.

Formulations according to the invention are very readily suitable as or for producing dishwashing detergents, in particular for machine dishwashing (automatic dishwashing or for short ADW). Formulations according to the invention themselves and dishwashing detergents produced from formulations according to the invention—in particular phosphate-free dishwashing detergents produced from formulations according to the invention—have a very good deposit inhibition particularly on ware made of glass during dishwashing. In particular, formulations according to the invention are also effective on stubborn stains, for example on tea stains and tea residues.

Examples of ware made of metal are cutlery, pots, pans and garlic presses, in particular cutlery items such as knives, cake slices and serving cutlery.

Examples of ware made of glass that may be mentioned here are: glasses, glass bowls, glass crockery such as, for example, glass plates, but also objects which have at least one surface made of glass, which may be decorated or undecorated, for example glass vases, transparent pot lids and glass vessels for cooking.

Examples of ware made of plastics that may be mentioned here are plates, cups, beakers and bowls made of melamine, polystyrene and polyethylene.

Examples of ware made of porcelain that may be mentioned here are plates, cups, beakers and bowls made of porcelain, white or colored, in each case with or without decoration.

The present invention therefore further provides the use of formulations according to the invention for the washing of dishes and kitchen utensils, and specifically in particular for machine dishwashing, i.e. for washing using a dishwasher. The present invention further provides a method for machine dishwashing using at least one formulation according to the invention, in the context of the present invention also called dishwashing method according to the invention. To carry out the dishwashing method according to the invention, the procedure may involve bringing dishes or cooking utensils into contact with an aqueous solution or suspension comprising at least one formulation according to the invention. After bringing them into contact, they can be left to act. Then, the liquor thus obtainable is removed, rinsing is carried out one or more times with preferably clear water and the dishes are left to dry.

In one embodiment of the present invention, the water used for the cleaning has a hardness in the range from 1 to 30° German hardness, preferably 2 to 25° German hardness, with German hardness being understood as meaning in particular the sum of magnesium hardness and calcium hardness.

In a particular variant of the dishwashing method according to the invention, neither regenerating salt nor separate rinse aid is used.

The present invention further provides a process for the preparation of formulations according to the invention, in the context of the present invention also called preparation process according to the invention. The preparation process according to the invention is characterized in that at least one compound (A), at least one graft copolymer (B) and optionally one or more further ingredients (D) and optionally peroxide (C) or chlorine bleach (C) are mixed together in one or more steps and then optionally water is completely or partially removed.

Compound (A), graft copolymer (B), peroxide (C) and further ingredients (D) are described above.

In another embodiment of the present invention, compound (A), one or more further ingredients (D) and optionally peroxide (C) are mixed in dry form and then an aqueous solution of graft copolymer (B) is added, either outside of or inside of a dishwasher.

In another embodiment of the present invention, compound (A), graft copolymer (B) and one or more further ingredients (D) and optionally peroxide (C) or chlorine bleach (C) are mixed in dry form and the thus obtained mixture is compressed to give moldings, in particular tablets.

In one embodiment of the present invention, before the water is at least partially removed, mixing with one or more further ingredients (D) for formulation according to the invention can be effected, for example with one or more surfactants, one or more enzymes, one or more enzyme stabilizers, one or more builders (D), preferably one or more phosphate-free builders (D), in particular one or more polymeric builders (D), one or more cobuilders, one or more alkali carriers, one or more bleach catalysts, one or more bleach activators, one or more bleach stabilizers, one or more antifoams, one or more corrosion inhibitors, one or more builders, with buffer or dye.

In one embodiment, the procedure involves removing the water from formulation according to the invention completely or partially, for example to a residual moisture in the range from zero to 15% by weight, preferably 0.1 to 10% by weight, by evaporating it, in particular by spray drying, spray granulation or compaction.

In one embodiment of the present invention, the water is removed, completely or partially, at a pressure in the range from 0.3 to 2 bar.

In one embodiment of the present invention, the water is removed, completely or partially, at temperatures in the range from 60 to 220° C.

In another embodiment, the water is not removed. Instead, further water may be added. Moreover, particular preference is given to adding a thickener. By this route it is possible to obtain liquid formulations according to the invention. At room temperature, liquid formulations according to the invention can be present for example in gel form.

By means of the preparation process according to the invention it is possible to readily obtain formulations according to the invention.

The formulations according to the invention can be provided in liquid or solid form, in single- or multi-phase form, as tablets or in the form of other dosage units, for example as so-called pouches, packaged or unpackaged.

The present invention further provides graft copolymers, in the context of the present invention also called for short graft copolymer (B) or graft copolymer according to the invention. Graft copolymers according to the invention are composed of (a) at least one graft base selected from nonionic monosaccharides, disaccharides, oligosaccharides and polysaccharides, and side chains obtainable by grafting on of (b) at least one ethylenically unsaturated mono- or dicarboxylic acid and (c) at least one compound of the general formula (I),

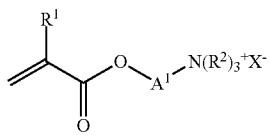

where the variables are defined as follows:
$R^1$ is selected from methyl and hydrogen,
$A^1$ is selected from $C_2$-$C_4$-alkylene,
$R^2$ are identical or different and selected from $C_1$-$C_4$-alkyl,
$X^-$ is selected from halide, mono-$C_1$-$C_4$-alkyl sulfate and sulfate.

Examples of mono-$C_1$-$C_4$-alkyl sulfate are methyl sulfate, ethyl sulfate, isopropyl sulfate and n-butyl sulfate, preferably methyl sulfate and ethyl sulfate. If $X^-$ is selected as sulfate, then $X^-$ is a half equivalent of sulfate.

Here, the variables are defined as follows:
$R^1$ is selected from methyl and hydrogen,
$A^1$ is selected from $C_2$-$C_4$-alkylene, for example —$CH_2$—$CH_2$—, $CH_2$—$CH(CH_3)$—, —$(CH_2)_3$—, —$(CH_2)_4$—, preference being given to —$CH_2$—$CH_2$— and —$(CH_2)_3$—,
$R^2$ are different or preferably identical and selected from $C_1$-$C_4$-alkyl, for example methyl, ethyl, n-propyl, n-butyl, isopropyl, isobutyl, sec-butyl, tert-butyl, preferably at least two $R^2$ are identical and in each case methyl, and the third group $R^2$ is ethyl, n-propyl or n-butyl, or two $R^2$ are identical and in each case ethyl, and the third group $R^2$ is methyl, n-propyl or n-butyl. Particularly preferably, all three $R^2$ are in each case identical and selected from methyl.

$X^-$ is selected from halide, for example iodide, bromide and in particular chloride, furthermore from mono-$C_1$-$C_4$-alkyl sulfate and sulfate.

In a preferred embodiment of the present invention, in monomer (c) the variables are selected as follows:
$R^1$ is hydrogen or methyl,
$R^2$ are identical and in each case methyl,
$A^1$ is $CH_2CH_2$, and
$X^-$ is chloride.

In one embodiment of the present invention, monomer (c) is selected from

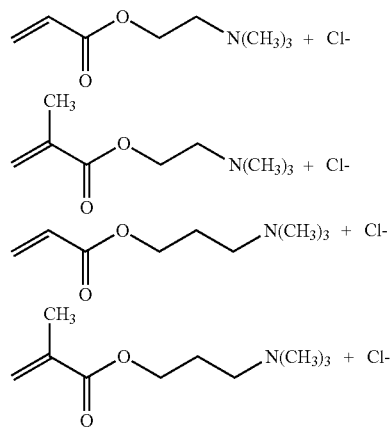

Graft copolymer (B) according to the invention can comprise in polymerized-in form in one or more side chains at least one further comonomer (d), for example hydroxyalkyl esters such as 2-hydroxyethyl (meth)acrylate or 3-hydroxypropyl (meth)acrylate, or esters of alkoxylated fatty alcohols, or comonomers containing sulfonic acid groups, for example 2-acrylamido-2-methylpropanesulfonic acid (AMPS) and its alkali metal salts.

Preferably, graft copolymer (B) according to the invention comprises, apart from monomer (c) and monocarboxylic acid (b) or dicarboxylic acid (b), no further comonomers (d) in one or more side chains.

In one embodiment of the present invention, the fraction of graft base (a) in graft copolymer (B) according to the invention is in the range from 40 to 95% by weight, preferably from 50 to 90% by weight, in each case based on total graft copolymer (B) according to the invention.

In one embodiment of the present invention, the fraction of monocarboxylic acid (b) or dicarboxylic acid (b) is in the range from 2 to 40% by weight, preferably from 5 to 30% by weight and in particular from 5 to 25% by weight, in each case based on total graft copolymer (B) according to the invention.

The monomers of type (c) are polymerized-in in amounts of from 5 to 50% by weight, preferably from 5 to 40% by weight and particularly preferably from 5 to 30% by weight, in each case based on total graft copolymer (B) according to the invention.

It is preferred if graft copolymer according to the invention comprises, in polymerized-in form, more monocarboxylic acid (b) than compound (c), and specifically based on the molar fractions, for example in the range from 1.1:1 to 5:1, preferably 2:1 to 4:1.

In one embodiment of the present invention, the average molecular weight ($M_w$) of graft copolymer (B) is in the range from 2000 to 200 000 g/mol, preferably from 5000 to 150 000 and in particular in the range from 8000 to 100 000 g/mol. The average molecular weight $M_w$ is measured preferably by gel permeation chromatography in aqueous KCl/formic acid solution.

The present invention further provides a process for the preparation of graft copolymers according to the invention, in the context of the present invention also called for short process according to the invention. To carry out the process according to the invention, the process can involve free-radically copolymerizing (b) at least one ethylenically unsaturated mono- or dicarboxylic acid and (c) at least one compound of the general formula (I) in the presence of at least one graft base (a).

Monocarboxylic acid (b), dicarboxylic acid (b), graft base (a) and monomer (c) are described above.

The process according to the invention is preferably carried out in water as solvent. Optionally, instead of water, a mixture of water and one or more organic solvents such as, for example, alcohols and ketones, but also dipolar-aprotic, water-miscible solvents such as e.g. DMSO, DMF or NMP can be used.

In one embodiment of the present invention, the process according to the invention is carried out at a temperature in the range from 60 to 120° C., preferably 65 to 100° C., very particularly preferably at 70 to 90° C.

In one embodiment of the present invention, the process according to the invention is carried out at atmospheric pressure. In another embodiment, the process according to the invention is carried out at a pressure in the range from 1.2 to 20 bar.

In a preferred variant, graft base (a) in aqueous solution is introduced and then monomer (c) and monocarboxylic acid (b) or dicarboxylic acid (b) is added in the presence of free-radical starter.

The process according to the invention can preferably be carried out in such a way that monomer (c) and monocarboxylic acid (b) or dicarboxylic acid (b) are not reacted completely with graft base (a), but are left to react e.g. by portionwise or continuous addition with graft base (a).

In another variant, the procedure involves firstly adding only some of monomer (c) and monocarboxylic acid (b) or dicarboxylic acid (b), and free-radical starter to the graft base (a), adding the remainder in a mixture with monomer (c) and monocarboxylic acid (b) or dicarboxylic acid (b) alongside one another, where in the case of each addition of monomer (c) and monocarboxylic acid (b) or dicarboxylic acid (b), free-radical starter is also added.

In a particularly preferred variant, firstly an aqueous solution of graft base (a) is introduced and heated to 60 to 120° C. Then, a part amount of monomers (c) is added, preferably continuously, together with a free-radical starter. After the reaction with the graft base (a) has subsided, a mixture of monocarboxylic acid (b) or dicarboxylic acid (b) and the remaining amount of monomer (c) are added, preferably continuously, together with further free-radical starter.

Examples of suitable free-radical starters are: azodiisobutyronitrile (AIBN), peroxides such as e.g. benzoyl peroxide, also hydroperoxides and peresters. Particular preference is given to using sodium peroxodisulfate and tert-butyl hydroperoxide or hydrogen peroxide, which can be used in the standard commercial concentrations and preparations, e.g. as aqueous or alcoholic solutions. In another embodiment, a mixture of $H_2O_2$ with iron(II) salts can be used. The hydrogen peroxide here is preferably used in the form of aqueous solutions. Free-radical initiators are preferably used in amounts of from 0.001 to 30 mol %, preferably from 0.1 to 25 mol % and in particular from 1 to 20 mol %, in each case based on the sum of molar amounts of monomer (c) and monocarboxylic acid (b) or dicarboxylic acid (b).

Monomer (c) per se can be polymerized in graft copolymer (B) or a nonquarternized equivalent, for example in the case of the halide or sulfate or $C_1$-$C_4$-alkyl sulfate of trimethylammonium ethyl (meth)acrylate by alternative polymerizing in of

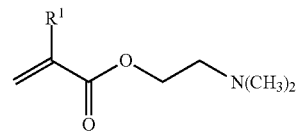

and in the case of the halide or sulfate or $C_1$-$C_4$-alkyl sulfate of trimethylammonium propyl (meth)acrylate by alternative polymerizing in of

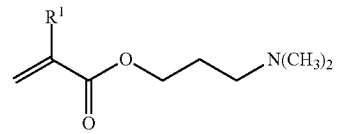

After the copolymerization, alkylation is carried out, for example with $C_1$-$C_4$-alkyl halide or $C_1$-$C_4$-dialkyl sulfate, for example with ethyl chloride, ethyl bromide, methyl chloride, methyl bromide, dimethyl sulfate or diethyl sulfate.

In one embodiment of the present invention, following completion of the addition of monocarboxylic acid (b) or dicarboxylic acid (b), monomer (c) and free-radical starter, further free-radical starters can be added, particularly preferably in the continuous feed process. Consequently, the content of monocarboxylic acid (b) or dicarboxylic acid (b) and monomer (c) in graft copolymer (B) according to the invention can be reduced.

In one embodiment of the present invention, after polymerization has ended, bleaching can be carried out, for example with peroxide such as $H_2O_2$.

In one embodiment of the present invention, when the polymerization is completed, residual monomer can be removed, in particular monocarboxylic acid (b) or dicarboxylic acid (b) can be at least largely removed by steam distillation.

Graft copolymer (B) according to the invention can preferably be obtained as aqueous solution, from which it can be isolated, e.g. by spray drying, spray granulation or freeze drying.

If it is desired to process or to store graft copolymer (B) according to the invention in the form of an aqueous solution, then it is preferred to add at least one biocide.

If desired, a solution of graft copolymer according to the invention or dried graft copolymer according to the invention can be used for producing the formulations according to the invention.

The invention is further illustrated by means of working examples.

EXAMPLES

General Remarks Concerning the Experiments Relating to Deposit Inhibition

All of the washing experiments were carried out in a dishwasher from Miele, model G1222 SCL. Here, the program at 65° C. for the wash cycle and 65° C. for the clear-rinse cycle was chosen. The tests were carried out with hardened water with a water hardness of 21 German hardness (Ca/Mg):$HCO_3$ (3:1):1.35. No separate rinse aid was added and the incorporated water softening (ion exchanger) was not regenerated with regenerating salt. 18 g of the stated formulation according to the invention were dosed in each wash cycle. At the start of each wash cycle, 50 g of a ballast soiling were added, consisting of grease, protein and starch.

To assess the deposit inhibition, a total of 30 successive washing experiments were carried out with the same test ware. The test ware used in each washing experiment was three stainless steel knives, three blue melamine plates, three drinking glasses and three porcelain plates. One hour was left between every two washing experiments, for 10 min of which the door of the dishwasher was closed and for 50 min of which the door was open.

After the end of the 30th washing experiment, the ware was removed from the machine after drying.

The glasses were photographed on a device for digital image analysis at curved surfaces using a line-scan camera. Image analysis software was used to calculate various values for the images (Weiss Imaging and Solutions GmbH, see e.g. SÖFW, 133, 10, 2007, pp. 48-52). The parameter that is meaningful for the deposit of the glass is the average of the gray value over the evaluated area. This comprises in the case of the glasses used (total height of 13.5 cm) the region above 2 cm from the base and 2.5 cm from the upper rim.

I. Preparation of Graft Copolymers (B) According to the Invention, of Formulations According to the Invention and of Comparison Formulations Comonomers used:
- (a.1): maltodextrin, commercially available as Cargill C*Dry MD01955
- (b.1): acrylic acid
- (c.1): [2-(methacryloyloxy)ethyl]trimethylammonium chloride ("TMAEMC")

In the context of the present application, data are in % percent by weight unless expressly stated otherwise.

The biocide used is always a 9% by weight solution of 1,2-benzisothiazolin-3-one in water/propylene glycol mixture, commercially available as Proxel™ XL2 Antimicrobial. Quantitative data are tell qu'elle.

I.1 Preparation of Graft Copolymer (B.1) According to the Invention

In a stirred reactor, 235 g of (a.1) in 618 g of water were introduced and heated to 80° C. with stirring. At 80° C., the following solutions were metered in simultaneously and via separate feeds as follows:
a) An aqueous solution of 28.8 g of (c.1) in 146 g of water, over the course of 4 hours.
b) A solution of 7.88 g of sodium peroxodisulfate in 68.0 g of water over the course of 5 h, simultaneously starting with the metered addition of a).
c) A solution of 29.9 g of (b.1) and 33.3 g of sodium hydroxide solution (50% strength in water), diluted with 139 g of water, over the course of 2 hours, starting 2 hours after the start of the metered addition of a).

After the complete addition of solutions a) to c), the reaction mixture was stirred for one hour at 80° C. Then, a solution of 0.58 g of sodium peroxodisulfate in 10.0 g of water was added and the mixture was stirred for a further 2 hours at 80° C. Then, the mixture was cooled to room temperature and 8 g of biocide were added. This gave a 23.2% by weight solution of the graft copolymer according to the invention (B.1).

I.2 Preparation of Graft Copolymer (B.2) According to the Invention

In a stirred reactor, 235 g of (a.1) in 618 g of water were introduced and heated to 80° C. with stirring. At 80° C., the following solutions were metered in simultaneously and via separate feeds as follows:
a) An aqueous solution of 43.6 g of (c.1) in 150 g of water, over the course of 4 hours.
b) A solution of 7.88 g of sodium peroxodisulfate in 68.0 g of water over the course of 5 h, simultaneously starting with the metered addition of a).
c) A solution of 15.1 g of (b.1) and 16.8 g of sodium hydroxide solution (50% strength in water), diluted with 139 g of water, over the course of 2 hours, starting 2 hours after the start of the metered addition of a).

After the complete addition of solutions a) to c), the reaction mixture was stirred for one hour at 80° C. Then, a solution of 0.59 g of sodium peroxodisulfate in 10.0 g of water was added and the mixture was stirred for a further 2 hours at 80° C. Then, the mixture was cooled to room temperature and 8 g of biocide were added. This gave a 23.2% by weight solution of the graft copolymer according to the invention (B.2).

I.3 Preparation of Graft Copolymer (B.3) According to the Invention

In a stirred reactor, 235 g of (a.1) in 618 g of water were introduced and heated to 80° C. with stirring. At 80° C., the following solutions were metered in simultaneously and via separate feeds as follows:
a) An aqueous solution of 47.7 g of (c.1) in 151 g of water, over the course of 4 hours.
b) A solution of 7.88 g of sodium peroxodisulfate in 68.0 g of water over the course of 5 h, simultaneously starting with the metered addition of a).
c) A solution of 11.0 g of (b.1) and 12.2 g of sodium hydroxide solution (50% strength in water), diluted with 139 g of water, over the course of 2 hours, starting 2 hours after the start of the metered addition of a).

After the complete addition of solutions a) to c), the reaction mixture was stirred for one hour at 80° C. Then, a solution of 0.59 g of sodium peroxodisulfate in 10.0 g of water was added and the mixture was stirred for a further 2 hours at 80° C. Then, the mixture was cooled to room temperature and 8 g of biocide were added. This gave a 23.2% by weight solution of the graft copolymer according to the invention (B.3).

I.4 Preparation of Graft Copolymer (B.4) According to the Invention

In a stirred reactor, 220 g of (a.1) in 618 g of water were introduced and heated to 80° C. with stirring. At 80° C., the following solutions were metered in simultaneously and via separate feeds as follows:
a) An aqueous solution of 40.6 g of (c.1) in 149 g of water, over the course of 4 hours.
b) A solution of 9.85 g of sodium peroxodisulfate in 68.0 g of water over the course of 5 h, simultaneously starting with the metered addition of a).

c) A solution of 32.8 g of (b.1) and 36.5 g of sodium hydroxide solution (50% strength in water), diluted with 139 g of water, over the course of 2 hours, starting 2 hours after the start of the metered addition of a).

After the complete addition of solutions a) to c), the reaction mixture was stirred for one hour at 80° C. Then, a solution of 0.73 g of sodium peroxodisulfate in 10.0 g of water was added and the mixture was stirred for a further 2 hours at 80° C. Then, the mixture was cooled to room temperature and 8 g of biocide were added. This gave a 22.4% by weight solution of the graft copolymer according to the invention (B.4).

I.5 Preparation of Graft Copolymer (B.5) According to the Invention

In a stirred reactor, 176 g of (a.1) in 618 g of water were introduced and heated to 80° C. with stirring. At 80° C., the following solutions were metered in simultaneously and via separate feeds as follows:

a) An aqueous solution of 87.1 g of (c.1) in 161 g of water, over the course of 4 hours.
b) A solution of 15.8 g of sodium peroxodisulfate in 68.0 g of water over the course of 5 h, simultaneously starting with the metered addition of a).
c) A solution of 30.2 g of (b.1) and 33.6 g of sodium hydroxide solution (50% strength in water), diluted with 139 g of water, over the course of 2 hours, starting 2 hours after the start of the metered addition of a).

After the complete addition of solutions a) to c), the reaction mixture was stirred for one hour at 80° C. Then, a solution of 1.16 g of sodium peroxodisulfate in 10.0 g of water was added and the mixture was stirred for a further 2 hours at 80° C. Then, the mixture was cooled to room temperature and 8 g of biocide were added. This gave a 22.7% by weight solution of the graft copolymer according to the invention (B.5).

I.6 Preparation of Graft Copolymer (B.6) According to the Invention

In a stirred reactor, 145 g of (a.1) in 618 g of water were introduced and heated to 80° C. with stirring. At 80° C., the following solutions were metered in simultaneously and via separate feeds as follows:

a) An aqueous solution of 80.1 g of (c.1) in 159 g of water, over the course of 4 hours.
b) A solution of 19.5 g of sodium peroxodisulfate in 68.0 g of water over the course of 5 h, simultaneously starting with the metered addition of a).
c) A solution of 64.9 g of (b.1) and 72.0 g of sodium hydroxide solution (50% strength in water), diluted with 139 g of water, over the course of 2 hours, starting 2 hours after the start of the metered addition of a).

After the complete addition of solutions a) to c), the reaction mixture was stirred for one hour at 80° C. Then, a solution of 1.45 g of sodium peroxodisulfate in 10.0 g of water was added and the mixture was stirred for a further 2 hours at 80° C. Then, the mixture was cooled to room temperature and 8 g of biocide were added. This gave a 22.9% by weight solution of the graft copolymer according to the invention (B.6).

I.7 Preparation of Graft Copolymer (B.7) According to the Invention

In a stirred reactor, 147 g of (a.1) in 618 g of water were introduced and heated to 80° C. with stirring. At 80° C., the following solutions were metered in simultaneously and via separate feeds as follows:

a) An aqueous solution of 49.5 g of (c.1) in 152 g of water, over the course of 4 hours.
b) A solution of 19.7 g of sodium peroxodisulfate in 68.0 g of water over the course of 5 h, simultaneously starting with the metered addition of a).
c) A solution of 97.3 g of (b.1) and 108 g of sodium hydroxide solution (50% strength in water), diluted with 139 g of water, over the course of 2 hours, starting 2 hours after the start of the metered addition of a).

After the complete addition of solutions a) to c), the reaction mixture was stirred for one hour at 80° C. Then, a solution of 1.46 g of sodium peroxodisulfate in 10.0 g of water was added and the mixture was stirred for a further 2 hours at 80° C. Then, the mixture was cooled to room temperature and 8 g of biocide were added. This gave a 24.0% by weight solution of the graft copolymer according to the invention (B.7).

I.8 Preparation of Graft Copolymer (B.8) According to the Invention

In a stirred reactor, 147 g of (a.1) in 618 g of water were introduced and heated to 80° C. with stirring. At 80° C., the following solutions were metered in simultaneously and via separate feeds as follows:

a) An aqueous solution of 96.5 g of (c.1) in 163 g of water, over the course of 4 hours.
b) A solution of 19.7 g of sodium peroxodisulfate in 68.0 g of water over the course of 5 h, simultaneously starting with the metered addition of a).
c) A solution of 50.2 g of (b.1) and 55.8 g of sodium hydroxide solution (50% strength in water), diluted with 139 g of water, over the course of 2 hours, starting 2 hours after the start of the metered addition of a).

After the complete addition of solutions a) to c), the reaction mixture was stirred for one hour at 80° C. Then, a solution of 1.46 g of sodium peroxodisulfate in 10.0 g of water was added and the mixture was stirred for a further 2 hours at 80° C. Then, the mixture was cooled to room temperature and 8 g of biocide were added. This gave a 23.2% by weight solution of the graft copolymer according to the invention (B.8).

I.9 Comparative Example

Preparation of a Comparison Graft Copolymer (C-9)

Comparison graft copolymer C-9 was prepared according to example 4 from EP 2 138 560 B1.

Preparation of formulation F.1 to F.8 according to the invention and of comparison formulation C-F.9

Formulations F.1 to F.8 according to the invention and comparison formulations C-F.9 were prepared by dry mixing the components according to Table 1—with the exception of surfactant 1. Nonionic surfactant 1 was melted and stirred into the dry mixture and thereby distributed as homogeneously as possible. If graft copolymer (B.1) is present as aqueous solution, then the graft copolymer can firstly be isolated by drying and added in solid form to the other solid components or be added separately to the dishwasher in the form of a solution. The components of formulations F.1 to F.8 according to the invention and comparison formulation C-F.9 are given in Table 1.

TABLE 1

Composition of formulations F.1 to F.4 according to the invention and comparison formulation C-F.9

| Constituent [g] | F.1 | F.2 | F.3 | F.4 | C-F.9 |
| --- | --- | --- | --- | --- | --- |
| (A.1) | 10 | 10 | 10 | 10 | 10 |
| Trisodium citrate dihydrate | 35 | 35 | 35 | 35 | 35 |
| (B) | 1 (B.1) | 1 (B.2) | 1 (B.3) | 1 (B.4) | — |
| C-9 | | | | | 1 |
| Polymeric builder (D.1) | 9 | 9 | 9 | 9 | 9 |

TABLE 1-continued

Composition of formulations F.1 to F.4 according to the invention and comparison formulation C-F.9

| Constituent [g] | F.1 | F.2 | F.3 | F.4 | C-F.9 |
|---|---|---|---|---|---|
| (C.1) | 10.2 | 10.2 | 10.2 | 10.2 | 10.2 |
| Nonionic surfactant 1 | 4 | 4 | 4 | 4 | 4 |
| Nonionic surfactant 2 | 1 | 1 | 1 | 1 | 1 |
| Protease | 2.5 | 2.5 | 2.5 | 2.5 | 2.5 |
| Amylase | 1 | 1 | 1 | 1 | 1 |
| $Na_2Si_2O_5$ | 2 | 2 | 2 | 2 | 2 |
| TAED | 4 | 4 | 4 | 4 | 4 |
| $Na_2CO_3$ | 19.5 | 19.5 | 19.5 | 19.5 | 19.5 |
| HEDP | 0.8 | 0.8 | 0.8 | 0.8 | 0.8 |

Explanation:
(A.1): MGDA-Na$_3$, 78% by weight, remainder is water
(C.1): Sodium percarbonate, 2 Na$_2$CO$_3$•3 H$_2$O$_2$
Nonionic surfactant 1: n-C$_8$H$_{17}$—CH(OH)—CH$_2$—O—(EO)$_{22}$—CH(CH$_3$)—CH$_2$—O-n-C$_{10}$H$_{21}$
Nonionic surfactant 2: n-C$_{10}$H$_{21}$—CH(OH)—CH$_2$—O—(EO)$_{40}$-n-C$_{10}$H$_{21}$
Na$_2$Si$_2$O$_5$: commercially as Britesil ® H 265 LC
HEDP: 1-Hydroxyethane-1,1-diphosphonate disodium salt
Polymeric builder (D.1): Polyacrylic acid M$_w$ 4000 g/mol as sodium salt, completely neutralized In formulation F.5 according to the invention, graft copolymer (B.1) according to the invention was replaced by an identical amount of (B.5), i.e. 1 g. For formulations F.6 to F.8 according to the invention, mutatis mutandis applies.

II. Experiments Relating to Deposit Inhibition

The gray values of the three glasses per experiment were averaged for each formulation. The higher the gray value, the greater the filming on the glass.

The difference in the gray values of formulation C-F.9 and the formulation according to the invention in question is shown in Table 2. The more negative the value, the greater the advantage in the deposit inhibition.

TABLE 2

Deposit inhibition as differential measurement of the gray values

| Formulation | Gray value (formulation according to the invention) - gray value (C-F.9) |
|---|---|
| F.1 | −0.3 |
| F.2 | −1.3 |
| F.3 | −0.6 |
| F.4 | −1.6 |
| F.5 | −3.5 |
| F.6 | −2.7 |
| F.7 | −2.0 |
| F.8 | −3.5 |

The invention claimed is:

1. A formulation comprising
   (A) at least one compound selected from methylglycine diacetate (MGDA) and glutamic acid diacetate (GLDA) and salts thereof,
   (B) at least one graft copolymer composed of
      (a) at least one graft base selected from nonionic monosaccharides, disaccharides, oligosaccharides and polysaccharides, and side chains obtainable by grafting on of
      (b) at least one ethylenically unsaturated mono- or dicarboxylic acid and
   (c) at least one compound of the general formula (I),

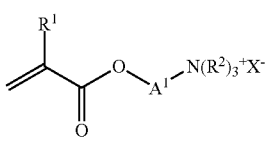

(I)

where the variables are defined as follows:
$R^1$ is selected from methyl and hydrogen,
$A^1$ is selected from $C_2$-$C_4$-alkylene,
$R^2$ are identical or different and selected from $C_1$-$C_4$-alkyl,
$X^-$ is selected from halide, mono-$C_1$-$C_4$-alkyl sulfate and sulfate.

2. The formulation according to claim 1, wherein said formulation is free from phosphates and polyphosphates.

3. The formulation according to claim 1, wherein compound (c) is selected from ω-trimethylaminoethyl (meth)acrylatochloride.

4. The formulation according to claim 1, wherein compound (A) is selected from the trisodium salt of methylglycine diacetate (MGDA).

5. The formulation according to claim 1, wherein the formulation is solid at room temperature.

6. The formulation according to claim 1, wherein the formulation comprises at least one inorganic peroxide compound (C).

7. The formulation according to claim 1 to 6, wherein the formulation comprises at least one polymeric builder (D).

8. The formulation according to claim 1, wherein the formulation comprises:
   in total in the range from 1 to 50% by weight of compound (A),
   in total in the range from 0.1 to 4% by weight of graft copolymer (B),
   based in each case on solids content of the formulation.

9. A process for washing dishes and kitchen utensils, the process comprising washing said dishes and kitchen utensils using the formulation according to claim 1.

10. A process for washing objects which have at least one surface made of glass wherein the glass is one of decorated and undecorated, the process comprising washing said objects using the formulation according to claim 1.

11. The process according to claim 9, wherein the washing comprises washing using a dishwasher.

12. A process for the preparation of formulations according to claim 1, wherein at least one compound (A) and at least one graft copolymer (B) are mixed together in one or more steps.

13. A graft copolymer (B) composed of
   (a) at least one graft base selected from nonionic monosaccharides, disaccharides, oligosaccharides and polysaccharides,
   and side chains obtainable by grafting on of
   (b) at least one ethylenically unsaturated mono- or dicarboxylic acid and
   (c) at least one compound of the general formula (I),

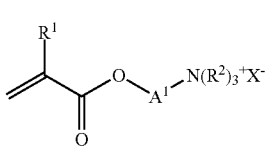

(I)

where the variables are defined as follows:

$R^1$ is selected from methyl and hydrogen, $A^1$ is selected from $C_2$-$C_4$-alkylene, $R^2$ are identical or different and selected from $C_1$-$C_4$-alkyl, $X^-$ is selected from halide, mono-$C_1$-$C_4$-alkyl sulfate and sulfate.

14. The graft copolymer (B) according to claim 13, in which the variables are defined as follows:

$R^1$ is hydrogen or methyl, $R^2$ are identical and in each case methyl, $A^1$ is $CH_2CH_2$, and $X^-$ is chloride.

15. A process for the preparation of graft copolymers according to claim 13, wherein
  (b) at least one ethylenically unsaturated mono- or dicarboxylic acid and
  (c) at least one compound of the general formula (I) are free-radically copolymerized in the presence of at least one graft base (a).

16. The process according to claim 12, wherein water is at least partially removed from the formulation after mixing.

17. The process according to claim 12, wherein component (C) comprises one of peroxide and chlorine bleach.

18. The process according to claim 16, wherein the water is removed by spray drying.

* * * * *